US012371313B2

(12) United States Patent
Clouser

(10) Patent No.: US 12,371,313 B2
(45) Date of Patent: Jul. 29, 2025

(54) BOTTLE ADAPTER PRESS AND RELATED SYSTEM AND METHOD

(71) Applicant: Gary L. Sharpe, Naples, FL (US)

(72) Inventor: Doug Clouser, Lewis Center, OH (US)

(73) Assignee: Gary L. Sharpe, Naples, FL (US)

( * ) Notice: Subject to any disclaimer, the term of this patent is extended or adjusted under 35 U.S.C. 154(b) by 0 days.

(21) Appl. No.: 18/234,722

(22) Filed: Aug. 16, 2023

(65) Prior Publication Data

US 2025/0059015 A1 Feb. 20, 2025

(51) Int. Cl.
*B67B 1/00* (2006.01)
*B67B 1/08* (2006.01)

(52) U.S. Cl.
CPC .................................... *B67B 1/08* (2013.01)

(58) Field of Classification Search
CPC ................. B67B 1/08; A61J 1/20; A61J 1/10
USPC .................. 100/229, 215; 53/132.1, 314, 76
See application file for complete search history.

(56) References Cited

U.S. PATENT DOCUMENTS 2,351,348 A * 6/1944 Mair ........................ B67B 1/08 53/76
4,903,881 A * 2/1990 Wieland, Jr. ......... A41H 37/005 100/231

OTHER PUBLICATIONS

Healthcare Logistics Inc., HCL® LUD Press, https://shop.gohcl.com, 2021, 1 page, USA.
Healthcare Logistics Inc., Mini-Bag/Vial Mate Applicator, https://shop.gohcl.com, 2021, 1 page, USA.

* cited by examiner

*Primary Examiner* — Jacob A Smith
(74) *Attorney, Agent, or Firm* — Standley Law Group LLP; Jeffrey S. Standley; Jeffrey C. Norris

(57) ABSTRACT

Devices and related systems and methods for installing an adapter, cap, plug, or other fitment in or over, or otherwise closing, filling, or sealing, an opening of a bottle, vial, or other container, wherein such devices are adjustable to enable use for different sizes of containers.

23 Claims, 23 Drawing Sheets

BOTTLE ADAPTER PRESS AND RELATED SYSTEM AND METHOD

BACKGROUND AND SUMMARY OF THE INVENTION

Exemplary embodiments of the present invention relate generally to devices and related systems and methods for installing a cap, plug, adapter, or otherwise closing, filling, or sealing an opening of a bottle or vial. While exemplary embodiments may be particularly useful for bottles or vials, other exemplary embodiments may additionally or alternatively be adapted to install a cap, plug, adapter, or otherwise close, fill, or seal an opening of any other type of container (e.g., cup, box, etc.) or other type of structure having an opening. For ease of description, exemplary embodiments may be described for use with a bottle or vial, but such disclosure may also apply to use with any other type of container or structure having an opening.

Bottles and vials often contain medicine, food, or other items that need, for example, to be protected from tampering or kept fresh. Accordingly, an adapter, cap, plug, or the like is used to close or seal a bottle or vial. Such fitments typically require a substantial amount of force to be installed, which may be facilitated by a mechanical device. However, bottles and vials may vary in size, which may complicate the use of a mechanical device. In particular, one known mechanical device may only be adapted to be used for a bottle or vial of one size. Different sizes of bottles or vials may therefore require the use of multiple mechanical devices to accommodate the different sizes. A need therefore exists for an improved mechanical device that is adjustable to enable use for different sizes of bottles or vials. A further need exists for adjustability that is not cumbersome and/or may be manually done.

Exemplary embodiments may satisfy at least one of the aforementioned needs. One example of a device or system of the present invention may be adapted to install a fitment on a container having an opening, wherein the device may comprise a base; at least one adjustable support wall extending substantially vertically relative to the base; a platform supported by the at least support wall; a lever supported by the platform; and a ram (which may also be referred to as an anvil) associated with the lever. Other exemplary embodiments may comprise any combination of the aforementioned features. In an exemplary operation, a bottle, vial, or other container may be positioned on the base (or another support surface in other exemplary embodiments) in order to receive a fitment such as an adapter. In particular, the lever may be operated (manually or automatically) to cause the ram to press a fitment on the container. Moreover, in the event there is need to press a fitment on a container or containers of another size, the at least one support wall is adjustable such that a distance between the base (or another support surface in other exemplary embodiments) and the platform is adjustable to account for the different size of container. In an exemplary embodiment, the adjustability may be manually performed, although some embodiments may require or benefit from the use of tools, machines, or automation for adjustment purposes.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to devices and related systems and methods for installing an adapter, cap, plug, or other fitment in or over, or otherwise closing, filling, or sealing, an opening of a bottle, vial, or other container. For ease of description, an exemplary embodiment may be described with respect to installing an adapter in an opening of a bottle or vial. Other exemplary embodiments of devices and related systems and methods may be similarly useful for other types of caps, plugs, or other types of fitments for other types of containers.

Figure 1:
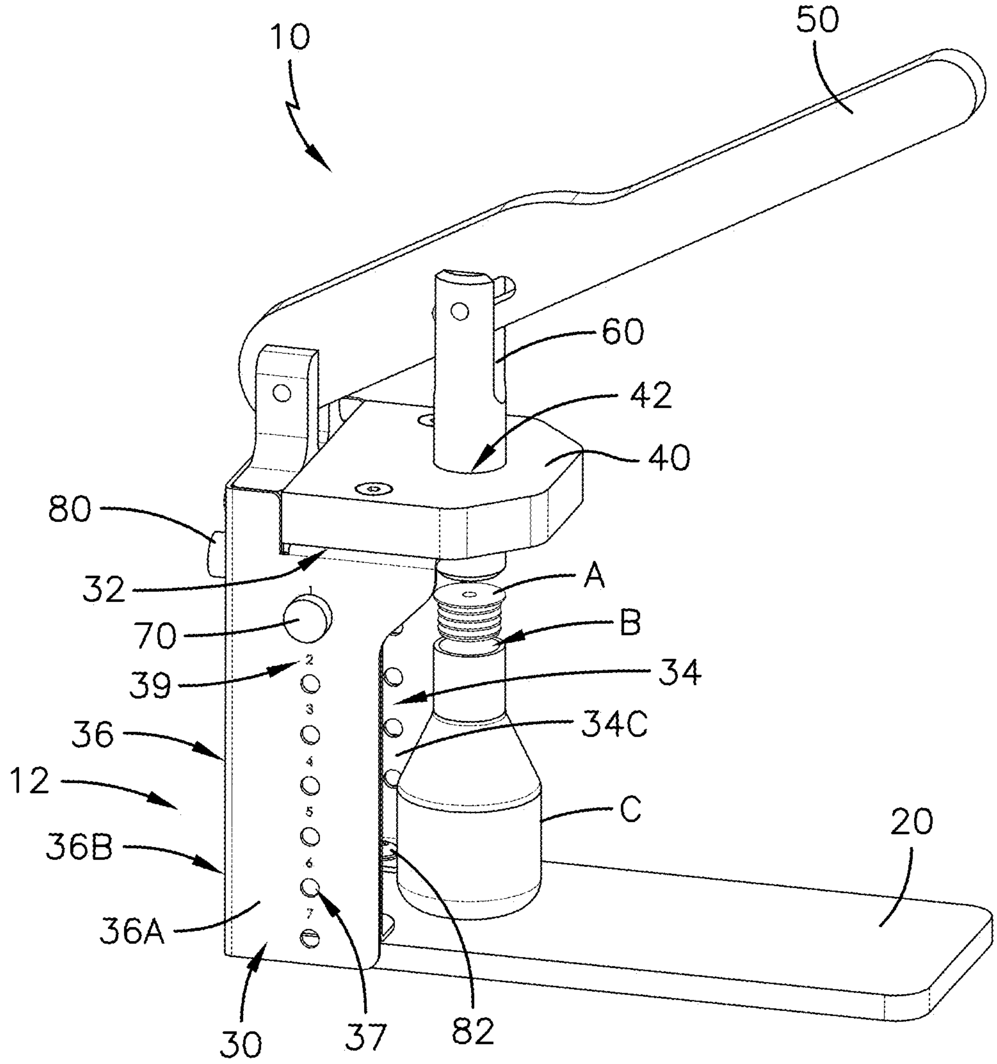
FIG. 1 is a perspective view of an embodiment of a bottle adapter press of the present invention, wherein an exemplary bottle and bottle adapter are also shown.
Figure 2:
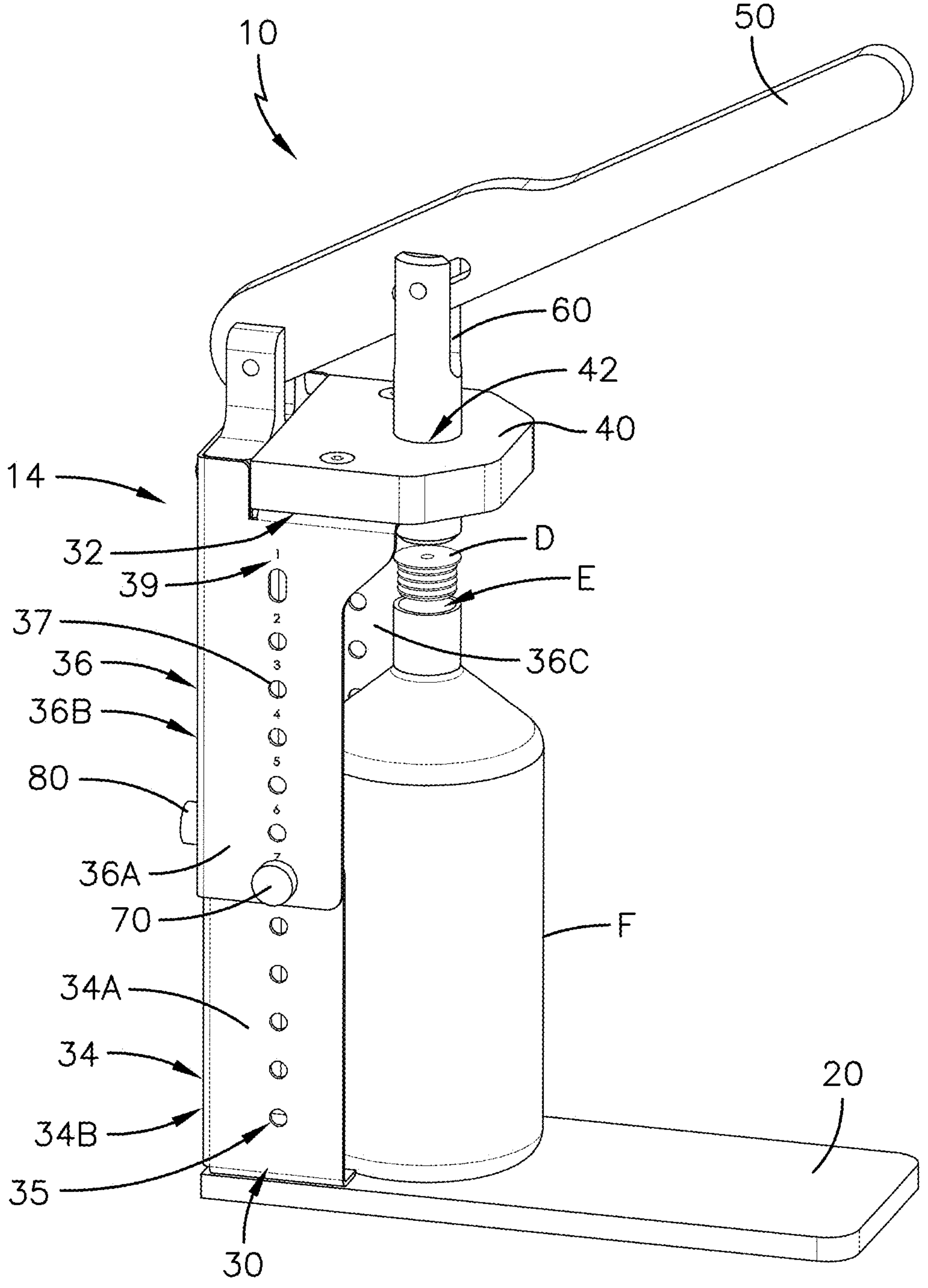
FIG. 2 is a perspective view of the bottle adapter press of FIG. 1, wherein another exemplary bottle and bottle adapter are also shown.

FIGS. 1-4 show an exemplary embodiment of a system or device 10 (which may also be referred to as a bottle adapter press). The bottle adapter press 10 is adapted to be configured to be useful for installing fitments, respectively, on various sizes of containers. For instance, FIG. 1 shows an example of the bottle adapter press 10 set in a first position 12 for installing an adapter A in an opening B of a relatively small container C. As will be further described below, the bottle adapter press 10 is adapted to be reconfigured to at least one other position for installing a fitment on, respectively, at least one other size of container. For example, FIG. 2 shows an example of the bottle adapter press 10 set in a second position 14 for installing an adapter D in an opening E of a relatively large container F. Exemplary embodiments of bottle adapter press 10 may be adapted to be adjusted into any desired number of positions, for example, such as may be needed for the expected container sizes that will require fitments.

This embodiment of bottle adapter press 10 comprises a base 20 that is adapted to receive a container (e.g., container C, container F, etc.) such that the container may receive a fitment (e.g., adapter A, adapter D, etc.). One example of base 20 may be a plate that is preferably comprised of aluminum such as based on weight, stability, and durability perspectives. Other embodiments of base 20 may be a contoured structure that has a defined place for positioning a container (e.g., a marked area; a different material; a depression; a raised edge or surface; etc.). Additionally, other embodiments of base 20 may be comprised of other suitable materials (e.g., metals, plastics, composites, etc.) unless otherwise noted. However, some other exemplary embodiments may not comprise such a base (e.g., a general support surface (e.g., a tabletop) may suffice for supporting some embodiments of a bottle adapter press and receiving a container).

In this embodiment, at least one support wall 30 is associated with base 20 to facilitate the installation of a fitment on a container. However, as mentioned above, some embodiments may have at least one support wall that is adapted to be associated with a general support surface (e.g., a tabletop) for the same purpose. In FIGS. 1-4, at least one support wall 30 extends substantially vertically (i.e., perpendicularly) relative to base 20. In some other embodiments, at least one support wall may extend at another angle relative to a base or other support surface for facilitating installation of a fitment on a container.

As will explained in more detail below, at least one support wall 30 is adjustable such that a vertical distance from an upper portion of said at least one support wall 30 relative to the base 20 (or alternatively to a general support surface for a container) is adjustable. Unless otherwise specified, the aforementioned adjustability of at least one support wall 30 may be achieved in any suitable manner. For instance, as aforementioned, FIG. 1 shows an example of at least one support wall 30 in a first position for facilitating the installation of a fitment A on a relatively small container C. However, unlike the known art that can only work with one size of container, the same system or device 10 may be adjusted to facilitate installation of a fitment on another size of container. For instance, as aforementioned, FIG. 2 shows an example of at least one support wall 30 in a second position for facilitating the installation of a fitment D on a relatively large container F. Some embodiments of a system or device 10 may only have two such positions, whereas other embodiments may have more such positions for use with a greater variety of sizes and types of containers.

This embodiment of system or device 10 further comprises a platform 40 that is adapted to facilitate the installation of a fitment on a container. In particular, platform 40 is supported by the at least one support wall 30 such that said platform 40 extends over the base 20. In this example, at least one support wall 30 comprises at least one support ledge 32 on which platform 40 is secured. However, unless otherwise specified, at least one support wall 30 may be adapted to support platform 40 in any suitable manner. In this embodiment, platform 40 defines an opening 42 that is adapted to facilitate the installation of a fitment on a container, as is discussed further below. Some embodiments, however, may not require a platform to extend over a base or other support surface, and/or may not require a platform to include an opening in order to facilitate installation of a fitment on a container.

A lever 50 is associated with platform 40 such that lever 50 is adapted to move between a first position and a second position. In this example, lever 50 is adapted to pivot between a first position and a second position. However, in other embodiments, a lever may have any suitable movement between a first position and a second position to facilitate installation of a fitment on a container.

In particular, a ram 60 (which may also be referred to as an anvil) is associated with lever 50 and configured to extend through opening 42 defined by platform 40. As a result, when lever 50 is moved from a first position to a second position, it is adapted to cause ram 60 to facilitate installation of (e.g., press) a fitment in or over the opening of a container. In this example, ram 60 is associated with lever 50 such that ram 60 is adapted to move in a substantially vertical direction when lever 50 is moved from a first position to a second position to facilitate installation of (e.g., press) a fitment in or over an opening of a container. Alternatively, a ram may be associated with a lever and be configured to extend relative to a platform in any suitable manner in other embodiments for facilitating installation of a fitment in or over an opening of a container, and/or some embodiments may have a ram that is adapted to move in any suitable direction when a lever is moved from a first position to a second position to facilitate installation of (e.g., press) a fitment in or over an opening of a container. In each of these variations, because at least one support wall 30 is adjustable such that a distance between base 20 (or other support surface in other exemplary embodiments) and platform 40 is also adjustable, ram 60 is adapted to be used to facilitate installation of (e.g., press) a fitment in or over respective openings of various sizes of containers.

Returning to at least one support wall 30, adjustability may be achieved in any suitable manner for facilitating installation of (e.g., press) a fitment in or over respective openings of various sizes of containers. In the example of FIGS. 1-4, at least one support wall 30 is comprised of a first support wall 34 and a second support wall 36, wherein first support wall 34 is in a slidable relationship with second support wall 36. However, some exemplary embodiments may only have one such wall or may comprise at least three such walls. Additionally, some exemplary embodiments may not require a slidable relationship. For example, a single wall may be adjustable (e.g., accordion-style), or multiple walls may have a non-slidable, yet still adjustable, relationship (e.g., stacked). It is conceived that there may be other variations of adjustability.

In this embodiment, to facilitate a slidable relationship, first support wall 34 and second support wall 36 have complementary shapes that facilitate a slidable relationship. In particular, first support wall 34 and second support wall 36 have complementary, generally U-shaped, cross-sectional configurations in this example to facilitate a slidable relationship, wherein first support wall 34 is positioned inside second support wall 36. Such as in this embodiment, each U-shaped configuration may be comprised of substantially planar portions that facilitate adjustability. Specifically, first support wall 34 has substantially planar portions 34A, 34B, and 34C that are adjoined to form a generally U-shaped cross-sectional configuration, and second support wall 36 has complementary, substantially planar portions 36A, 36B, and 36C that are adjoined to form a generally U-shaped cross-sectional configuration. More particularly, in this exemplary embodiment, substantially planar portions 34A and 36A oppose and are substantially parallel to substantially planar portions 34C and 36C, wherein substantially planar portions 34B and 36B are substantially perpendicular to substantially planar portions 34A, 36A, 34C, and 36C. However, in some other exemplary embodiments, the support walls may have different cross-sectional shapes, with or without substantially planar portions, yet still facilitate adjustability (e.g., a slidable relationship) such as otherwise described herein.

Figure 3:
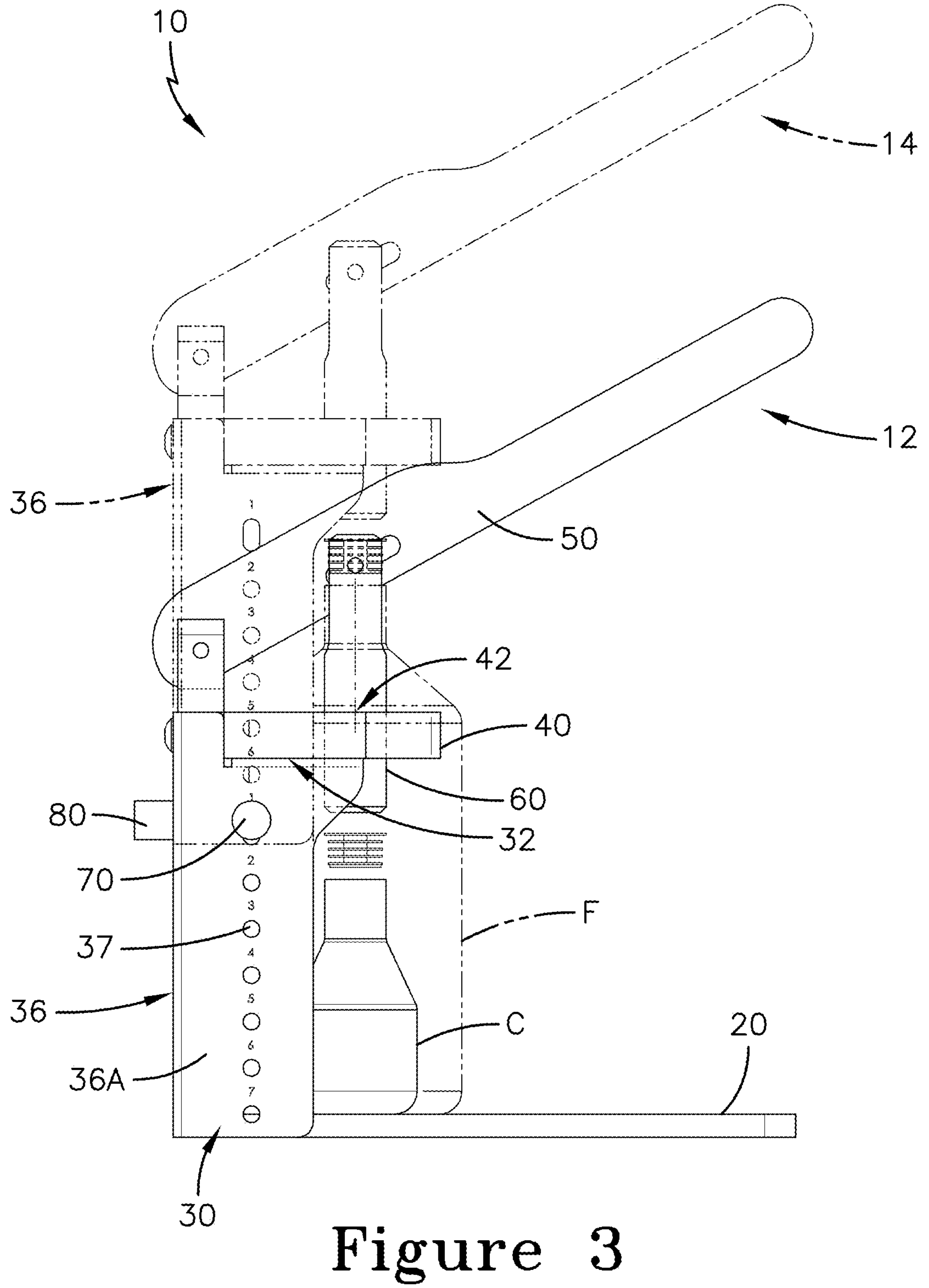
FIG. 3 is a perspective view of the bottle adapter press of FIG. 1 in a first position for use with the exemplary bottle and bottle adapter of FIG. 1, and also showing in phantom the bottle adapter press of FIG. 1 in a second position for use with the other exemplary bottle and bottle adapter of FIG. 2.

In the example of FIGS. 1-4, the slidable relationship between first support wall 34 and second support wall 36 is indexable such that respective distances between base 20 and platform 40 are adapted to be set. In other words, the distance between base 20 (or other support surface in other embodiments) and platform 40 may be adapted to be set in multiple positions to facilitate installation of (e.g., press) a fitment in or over respective openings of various sizes of containers. More particularly, as best shown in FIGS. 2 and 3, first support wall 34 defines at least one hole 35 in substantially planar portion 34A, and second support wall 36 defines a set of multiple holes 37 in substantially planar portion 36A. To adjust, at least one hole 35 of the first support wall 34 is adapted to be aligned with at least a respective one of the set of multiple holes 37 of the second support wall 36 such that a distance between base 20 (or other support surface in other embodiments) and platform 40 is adapted to be set. In this example, at least one hole 35 is also in a set of multiple such holes of first support wall 34 such that the set of multiple holes 35 of first support wall 34 is adapted to be aligned with the set of multiple holes 37 of second support wall 36. As a result, there may be a greater number of distances that may be set by aligning at least a respective one of the set of holes 35 with at least a respective one of the set of multiple holes 37 of the second support wall 36.

In this example, first support wall 34 may also define at least one hole in substantially planar portion 34C such as shown in FIG. 1, and second support wall 36 may also define a set of multiple holes in substantially planar portion 36C such as shown in FIG. 2. Such as in this example, the at least one hole in substantially planar portion 34C may be similar to at least one hole 35 in substantially planar portion 34A, and the set of multiple holes in substantially planar portion 36C may be similar to the set of multiple holes 37 in substantially planar portion 36A. However, in some other embodiments, the number, arrangement, and/or types of holes in the respective portions may be different. It is also possible for the holes or the types of holes in the respective wall portions to be reversed. For example, a first support wall may define a set of multiple holes, and a second support wall may define at least one hole.

As will be described further below, it should also be noted that substantially planar portion 34B of first support wall 34 and substantially planar portion 36B of second support wall 36 may each also comprise at least one hole. Similar to the holes in the other portions, the at least one hole of substantially planar portion 34B may be aligned with the at least one hole of substantially planar portion 36B to assist with setting the distance between base 20 (or other support surface in other embodiments) and platform 40 and/or to stabilize first support wall 34 and second support wall 36 such as during a process of installing a fitment on a container. For instance, in some embodiments, the respective holes of substantially planar portion 34B and substantially planar portion 36B may have characteristics similar to the respective holes of substantially planar portion 34A and substantially planar portion 36A. Additionally or alternatively, as described further below, at least one hole of substantially planar portion 34B and/or substantially planar portion 36B may be a receptacle such as for receiving an attachment of, or for use with, device 10. Likewise, additionally or alternatively, other planar portions may, respectively, also have at least one hole that may serve as a receptacle such as for receiving an attachment of, or for use with, device 10.

Figure 4:
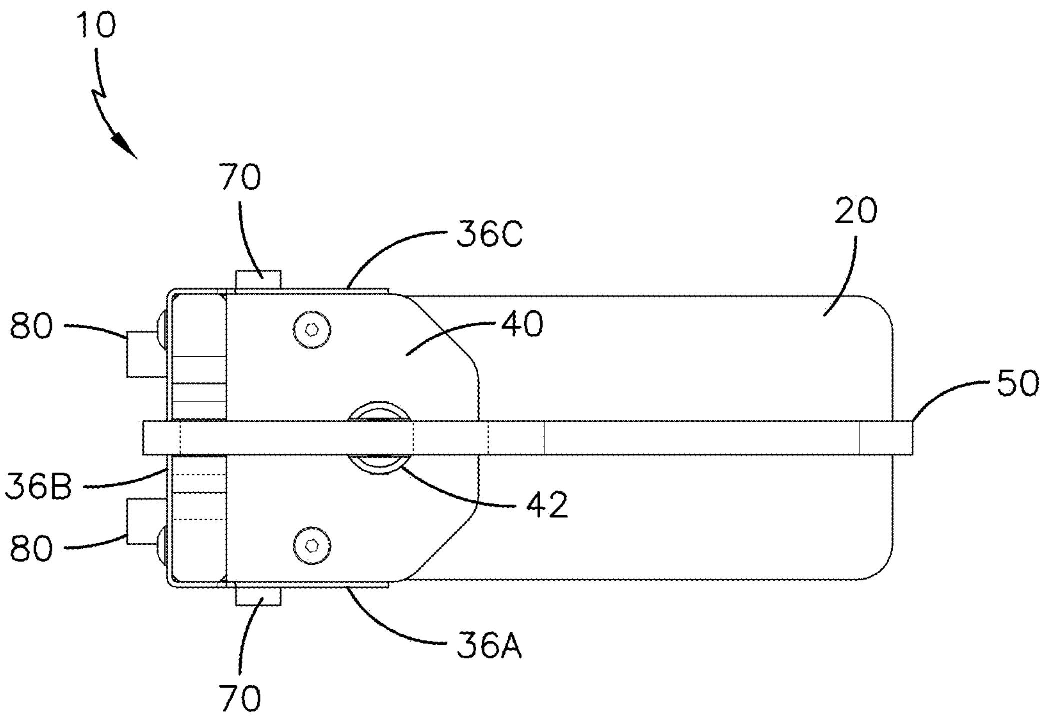
FIG. 4 is a top plan view of the bottle adapter press of FIG. 1.
Figure 5:
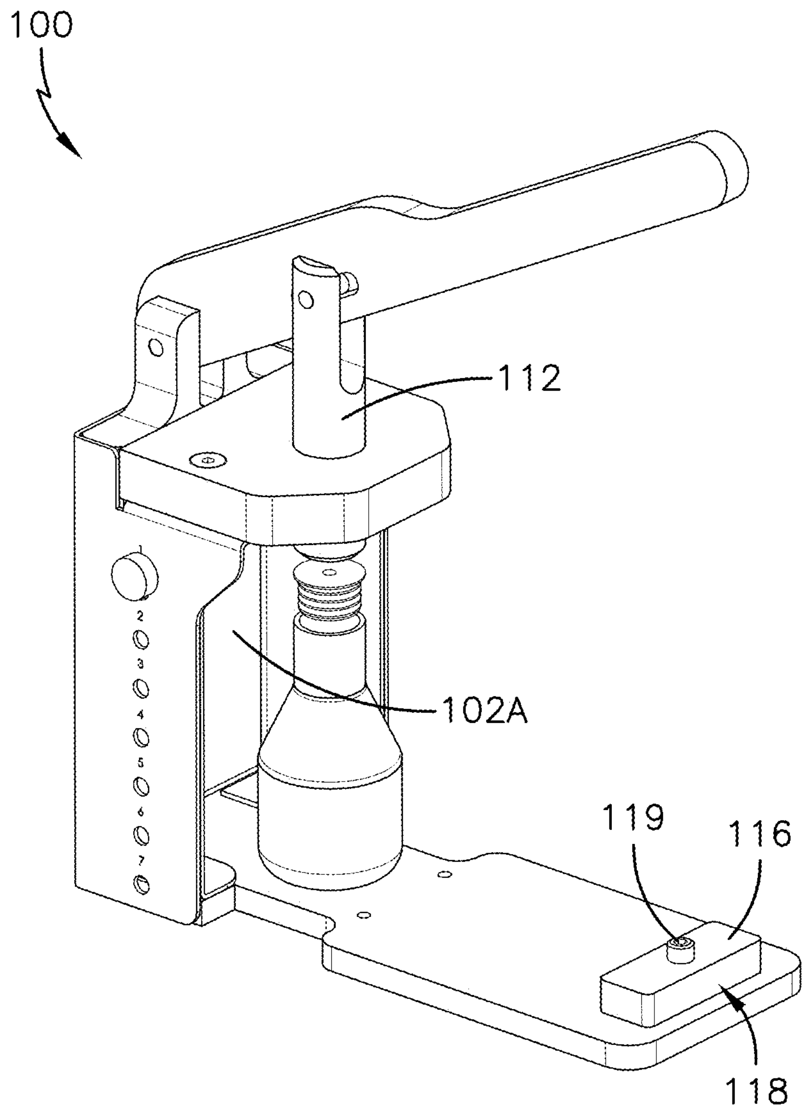
FIG. 5 is a perspective view of another exemplary embodiment of a bottle adapter press of the present invention, wherein an exemplary bottle and bottle adapter are also shown.
Figure 6:
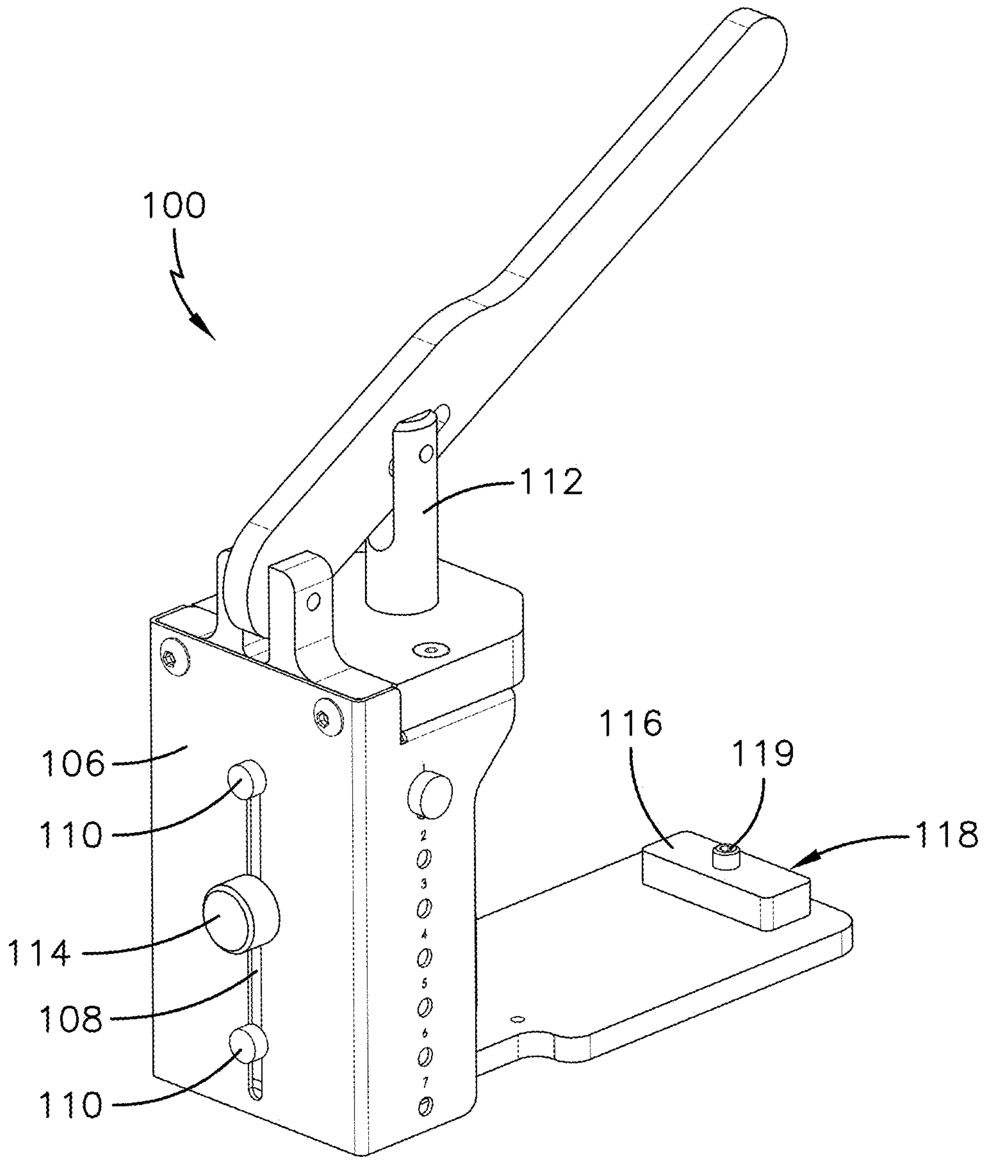
FIG. 6 is a perspective view of the bottle adapter press of FIG. 5.

When the aforementioned holes are aligned, any suitable device (e.g., a fastener, pin, rod, etc.) or other means may be used with respect to the aligned holes to set a desired distance between base 20 (or other support surface in other embodiments) and platform 40. For example, in FIGS. 1-4, at least one thumb screw 70 is positioned in the aligned holes of substantially planar portions 34A/36A to set the desired distance. For instance, hole 35 of first support wall 34 may be a tapped hole or comprise a weld stud for receiving and securing thumb screw 70. However, hole 37 of second support wall 36 may additionally or alternatively be a tapped hole or comprise a weld stud in other embodiments. Also, such as shown in FIG. 4, at least one thumb screw 70 may also be similarly positioned in the aligned holes of substantially planar portions 34C/36C to assist with setting the desired distance.

Any of the aforementioned holes of first support wall 34 and/or second support wall 36 may be labelled (e.g., numbered) to assist with the setting of a desired distance between base 20 (or other support surface in other embodiments) and platform 40. In this example, each hole of second support wall 36 is labelled such as indicated at arrow 39 with respect to the top hole 37. In another embodiment, each hole of first support wall 34 may alternatively or additionally be labelled. Other embodiments may only have certain holes labelled for reference points.

Additionally, as mentioned above and will also be further addressed with respect to other embodiments, at least one other device (e.g., a fastener, pin, rod, etc.) or other means may be used to secure or further secure first support wall 34 to second support wall 36. In this example, at least one fastener 80 may be used to further secure substantially planar portion 34B of first support wall 34 to substantially planar portion 36B of second support wall 36, which may also stabilize those walls such as during a process of installing a fitment on a container. More particularly, in this embodiment, there are two fasteners 80 arranged horizontally across substantially planar portion 36B (e.g., at least one hole of first support wall 34 may be aligned with at least one hole of second support wall 36 to receive each fastener 80 in a manner similar to at least one thumb screw 70, which may also facilitate adjustability as previously described). Other embodiments may have one or more such fasteners, which may be arranged in a different manner relative to each other (if more than one) or on a different portion of at least one support wall 30.

Also, in this exemplary embodiment, at least one fastener 82 may be used to secure first support wall 34 and optionally also second support wall 36 (such as shown in FIG. 2) to base 20. Furthermore, regardless of the type of adjustability, first support wall 34 may be associated with base 20 (or other support surface in other embodiments) in any suitable manner. For instance, such as shown in FIG. 1, first support wall 34 may be secured to base 20 by at least one fastener 82, which may help to stabilize first support wall 34 and second support wall 36 when lever 50 is used to install a fitment. In particular, at least one fastener 82 may help to prevent or otherwise limit first support wall 34 and second support wall 36 from kicking out when lever 50 is used to install a fitment. Other embodiments may not require a first support wall to be secured to a base or other support structure, and/or other embodiments may have a second support wall additionally or alternatively associated with a base (or other support surface in other embodiments) such as shown in FIG. 2.

Figure 7:
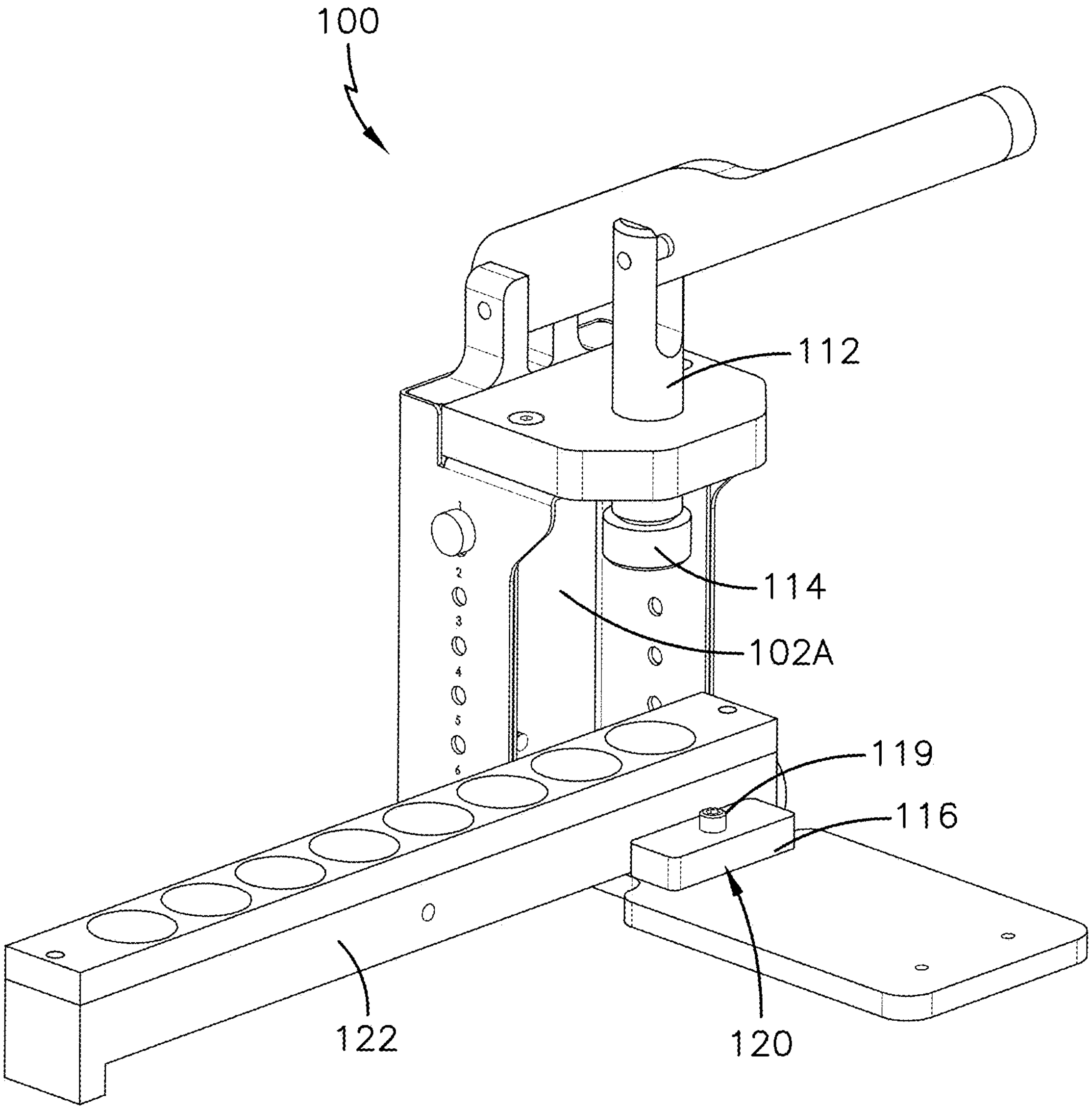
FIG. 7 is a perspective view of the bottle adapter press of FIG. 5, wherein the bottle adapter press is shown in association with an exemplary tray adapted to hold vials, respectively, in position to receive an adapter.
Figure 8:
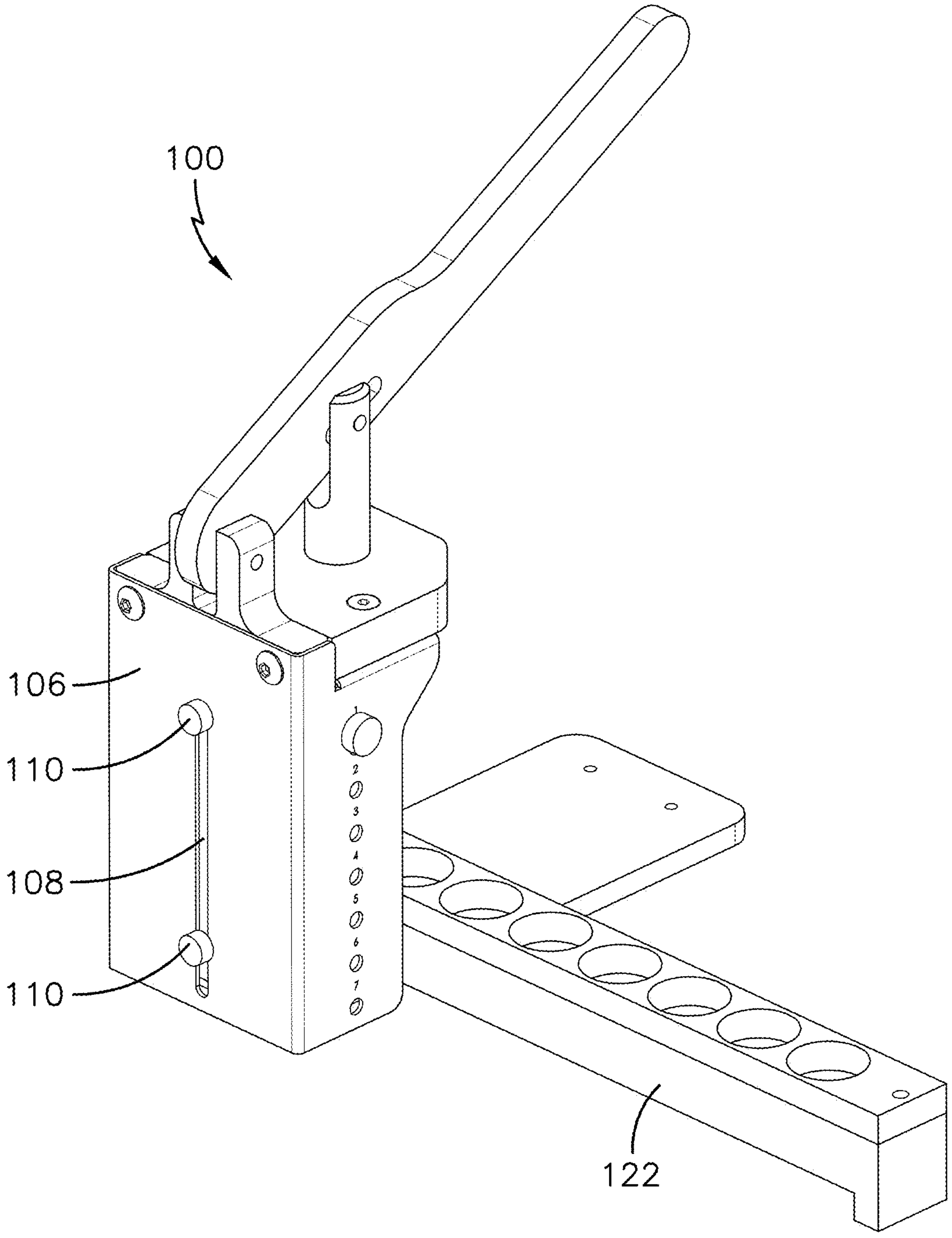
FIG. 8 is a perspective view of the bottle adapter press of FIG. 5, wherein the tray of FIG. 7 is again shown.
Figure 9:
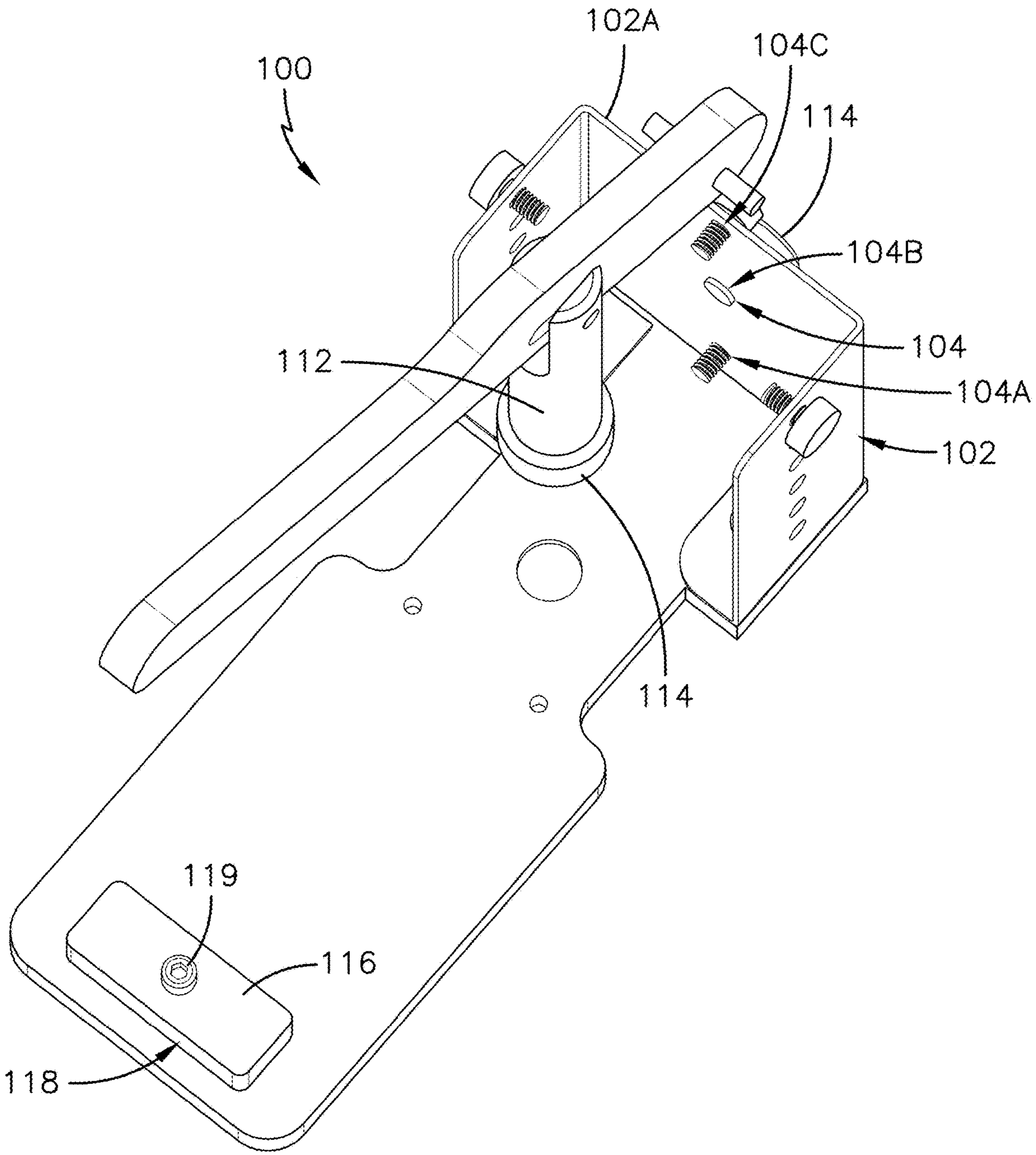
FIG. 9 is a perspective view of the bottle adapter press of FIG. 5, wherein an outer support wall of the bottle adapter press is not shown for clarity.

FIGS. 5-9 show an embodiment of a device 100 that may be similar to device 10. In this embodiment, a first support wall 102 comprises a portion 102A that defines at least one hole 104 (e.g., a set of multiple holes 104A, 104B, and 104C), and a second support wall 106 defines a slot 108. To facilitate adjustment, slot 108 is adapted to be aligned with at least one hole 104 of first support wall 102 such that a distance between the base (or other support surface in other embodiments) and platform is adapted to be set. In this exemplary configuration, thumb screws 110 are, respectively, positioned in holes 104A and 104C. Additionally or alternatively, at least one hole 104 may be a receptacle such as for receiving an attachment of, or for use with, device 100. In this regard, FIGS. 7 and 9 show that an exemplary embodiment of ram 112 may comprise an attachment 114, which may have any suitable type of connection to a remaining portion of ram 112 that allows for it to be removed when desired, including, but not limited to, a mechanical fit such as being a screw fit, a frictional fit, or another type of fastener. In this example, press adapter 114 is adapted to facilitate installation of a fitment on a container. However, press adapter 114 may be removed, such as to prepare device 100 for storage, or an extra press adapter 114 may simply be stored on device 100. For example, in FIGS. 6 and 9, hole 104B is shown being used to store a press adapter 114 that is not being used. In the configuration of device 100 shown in FIGS. 5-9, all holes 104 are aligned with slot 108. However, in some other exemplary configurations (i.e., height settings) of device 100, regardless of the use of each hole 104, only a portion of the holes 104 may be aligned with a slot 108.

In this exemplary embodiment, device 100 also comprises a guide block 116, which may assist with the positioning of a container for the installation of a fitment. Guide block 116 is associated with the base in this embodiment, but may be associated with another suitable support surface in another exemplary embodiment. In this example, a fastener or another suitable means of connection may allow guide block 116 to be moved from a first position 118 (see FIGS. 5, 6, and 9) when not in use to at least a second position 120 (see FIG. 7) when assisting with the positioning of a container for the installation of a fitment. In the example of FIG. 7, guide 116 is assisting with the positioning of a tray 122 that is adapted for use with Tamper Tuf™ vials, which are both commercially available from Health Care Logistics. In use, once a vial receives a fitment, tray 122 may be repositioned (e.g., slid) such that the next vial in the tray 122 may be in position to receive a fitment, wherein the guide block 116 may help with positioning of tray 122. However, some other exemplary embodiments may not include a guide block or may have a guide block that has only one position.

Figure 10:
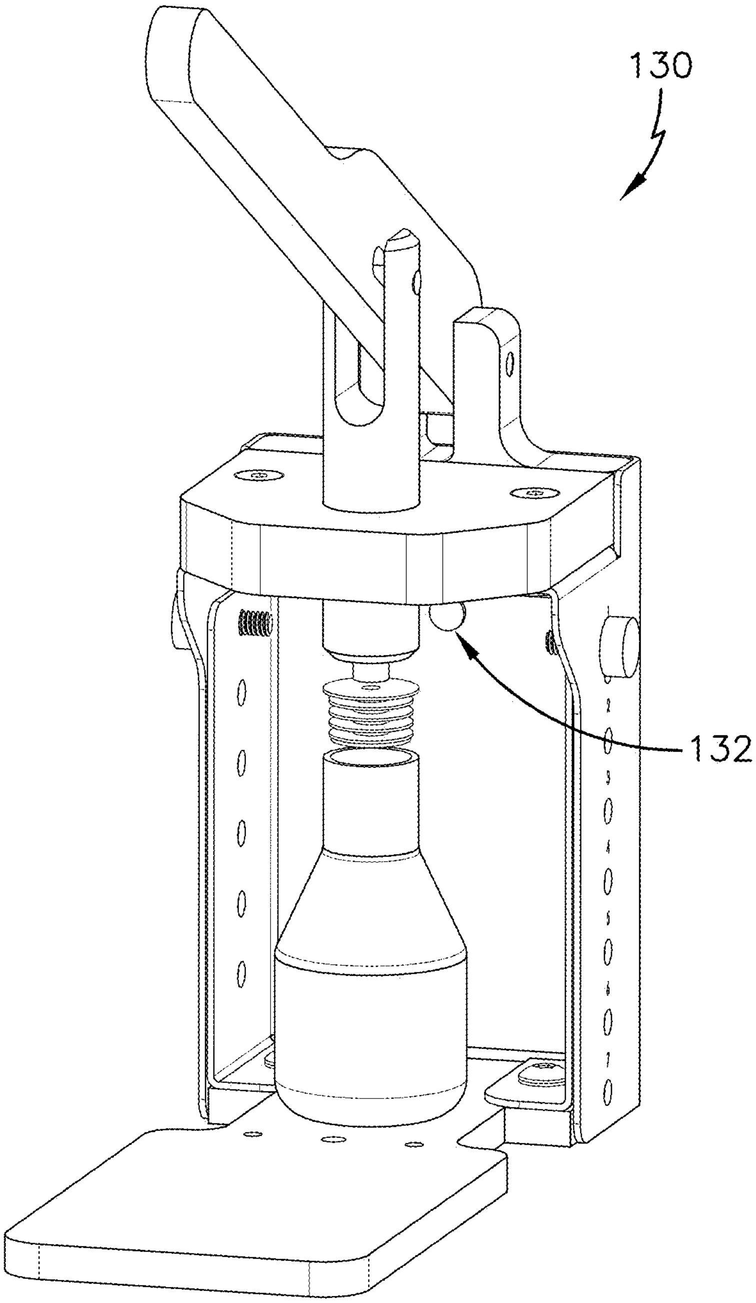
FIG. 10 is a perspective view of another exemplary embodiment of a bottle adapter press of the present invention, wherein an exemplary bottle and bottle adapter are also shown.
Figure 11:
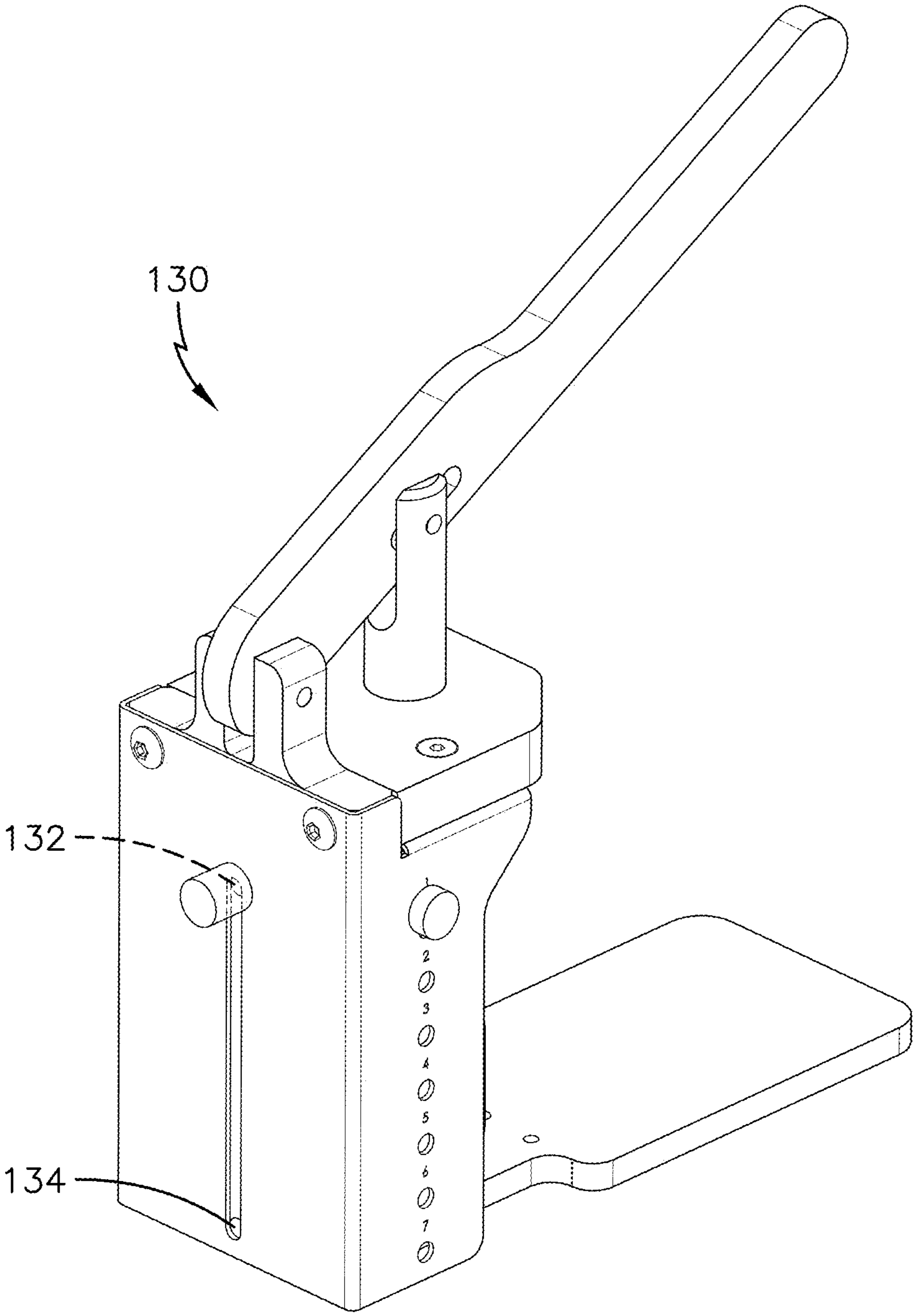
FIG. 11 is a perspective view of the bottle adapter press of FIG. 10.
Figure 12:
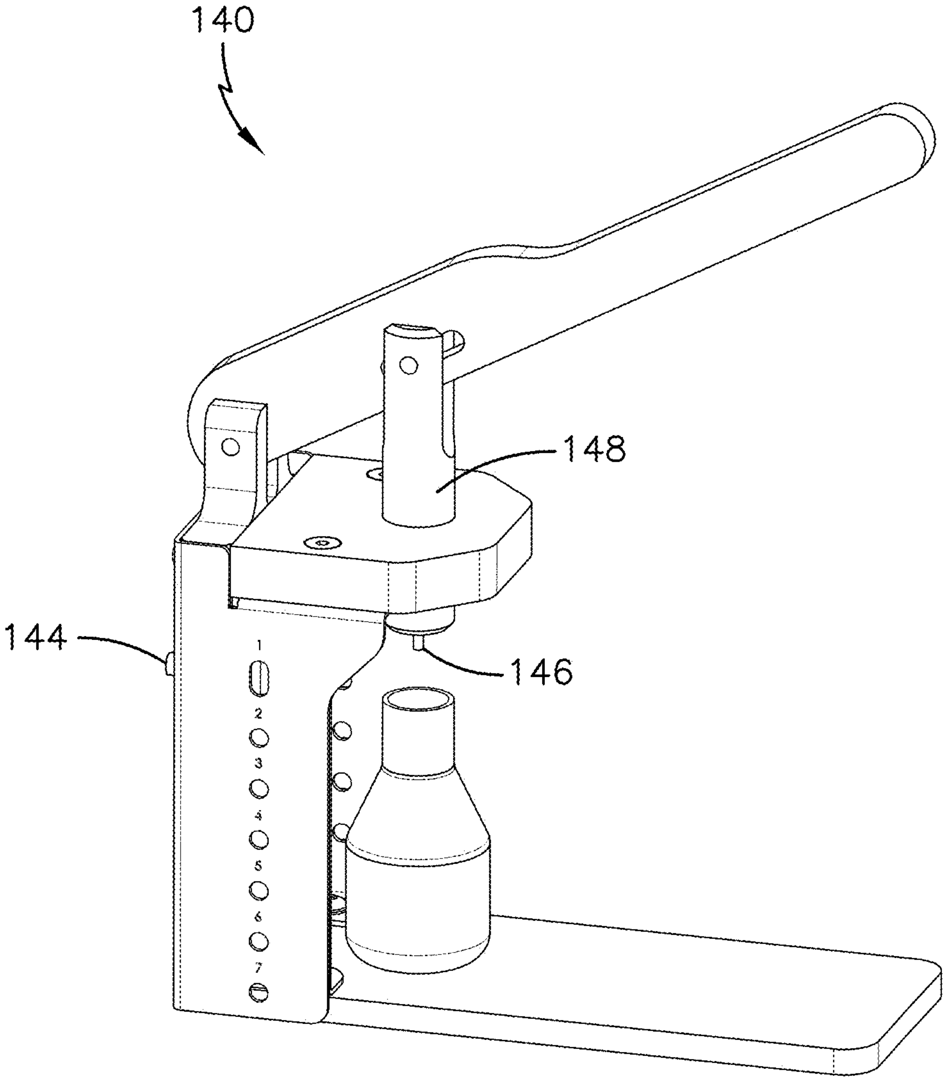
FIG. 12 is a perspective view of another exemplary embodiment of a bottle adapter press, wherein an exemplary bottle is also shown.
Figure 13:
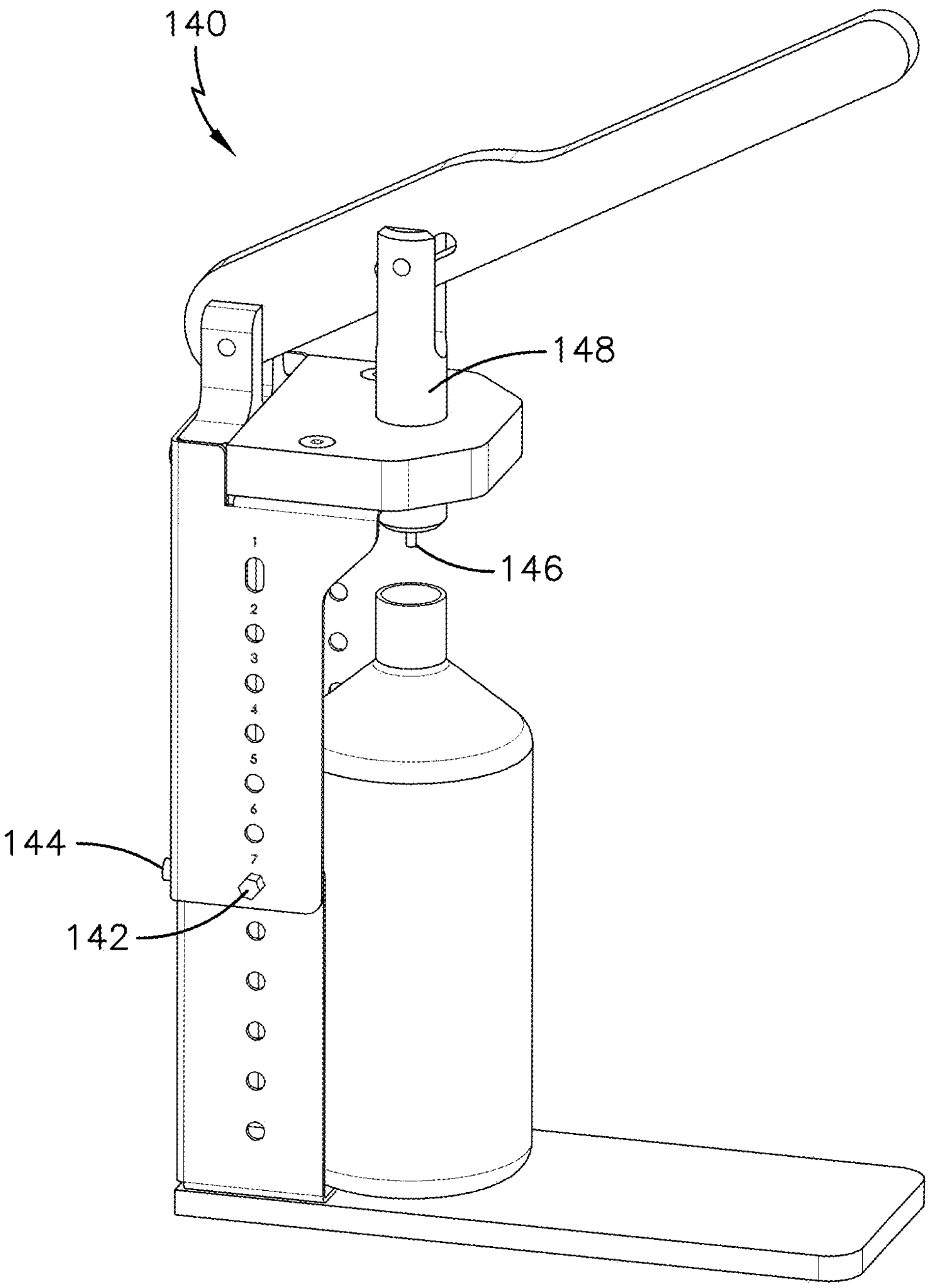
FIG. 13 is a perspective view of the bottle adapter press of FIG. 12, wherein another exemplary bottle is also shown.
Figure 14:
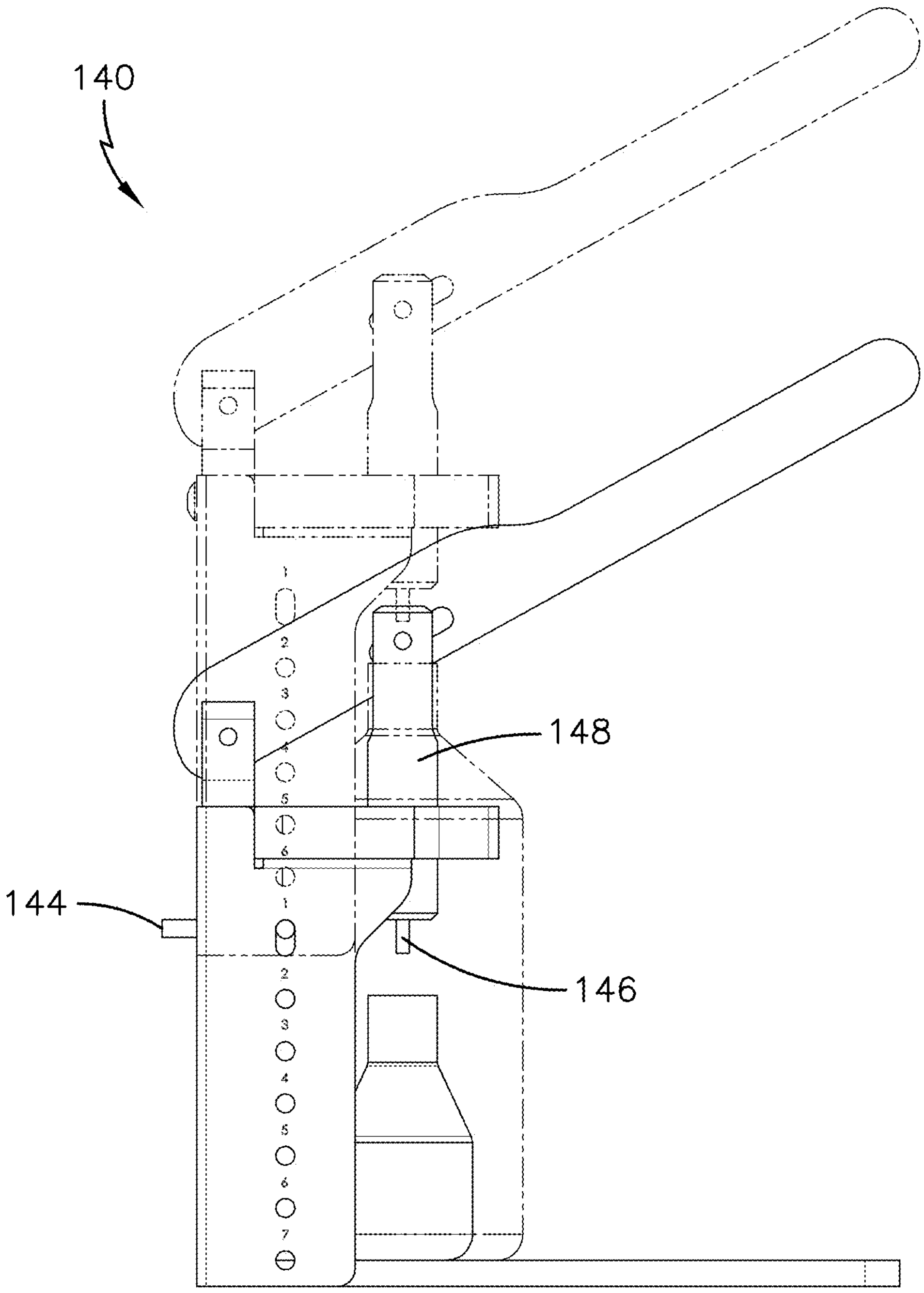
FIG. 14 is a perspective view of the bottle adapter press of FIG. 12 in a first position for use with the exemplary bottle of FIG. 12, and also showing in phantom the bottle adapter press of FIG. 12 in a second position for use with the other exemplary bottle of FIG. 13.
Figure 15:
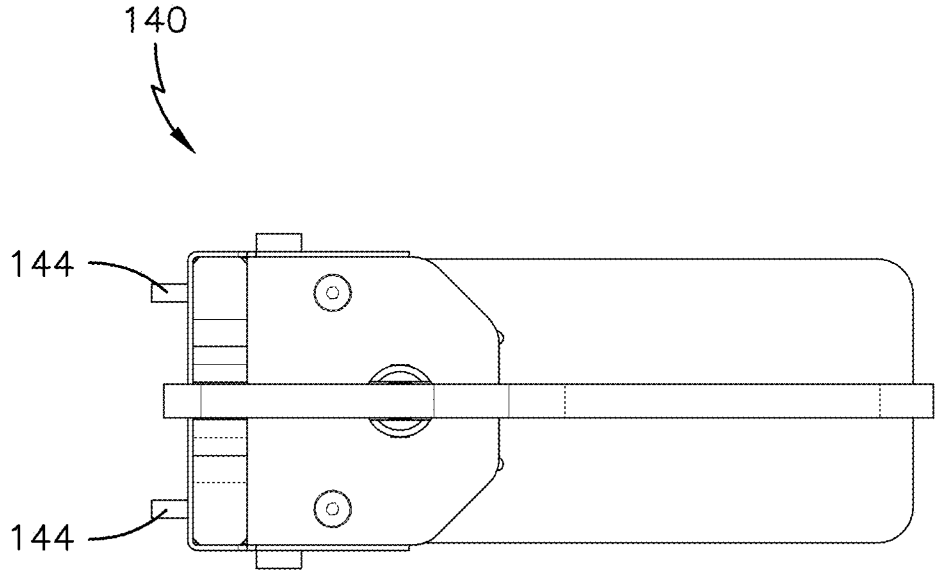
FIG. 15 is a top plan view of the bottle adapter press of FIG. 12.

FIGS. 10 and 11 show another exemplary embodiment of a device 130. Device 130 may be most similar to device 100. In this example, the first support wall only comprises holes 132 and 134 that are adapted to be aligned with the slot.

An exemplary embodiment of a device 140 is shown in FIGS. 12-15, which may be most similar to device 10. In this exemplary embodiment, device 140 comprises bolts 142 that may be used similarly to the aforementioned thumb screws 70 in FIGS. 1-4. Additionally, device 140 comprises at least one weld stud 144 that may be used similarly to fastener 80 in FIGS. 1-4. The ram of device 140 also comprises a different press adapter 146. In particular, press adapter 146 is a screw that is screwed in the ram 148, wherein the head of the screw is adapted to press the sealing ball into an Easy Fill™ vial, which is commercially available from Health Care Logistics. When device 140 is to be used to install fitments on a different type of container, press adapter 146 may be unscrewed from ram 148 and then, for example, screwed or otherwise inserted into a guide block such as shown by the press adapter 119 in FIGS. 5-7.

Figure 20:
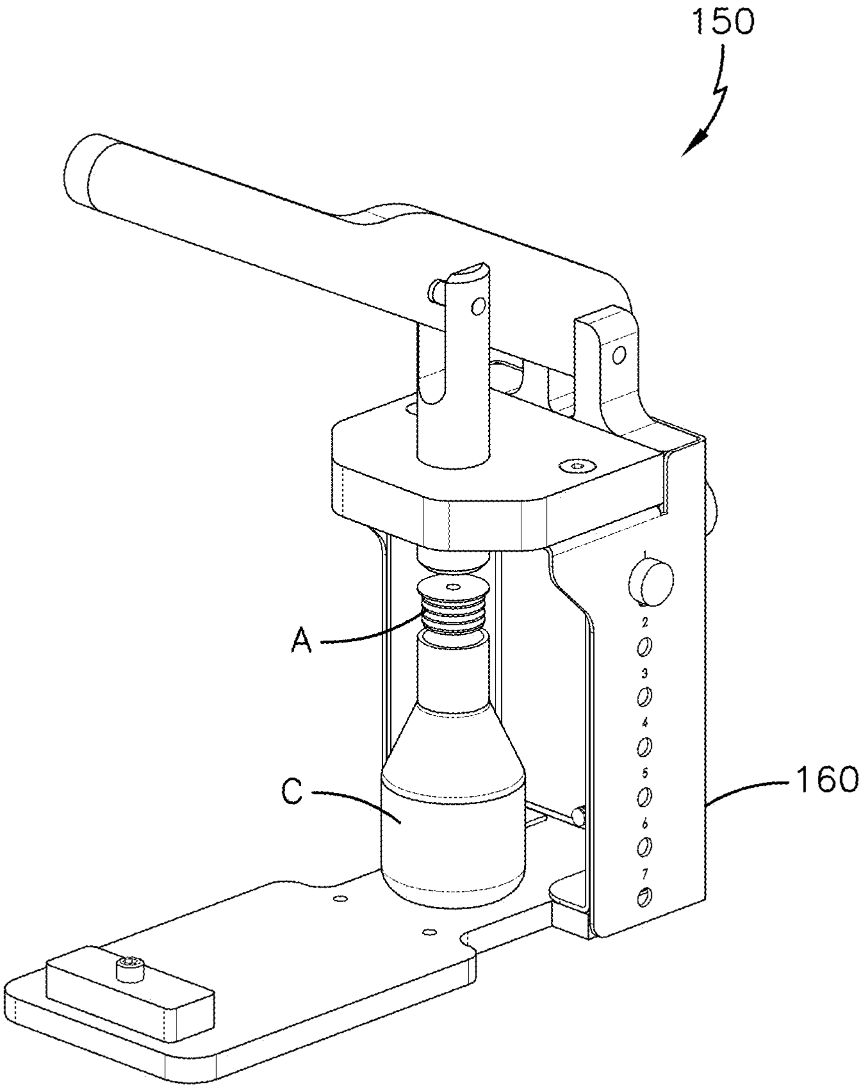
FIG. 20 is a perspective view of the bottle adapter press of FIG. 16, wherein an exemplary bottle and bottle adapter are also shown.
Figure 21:
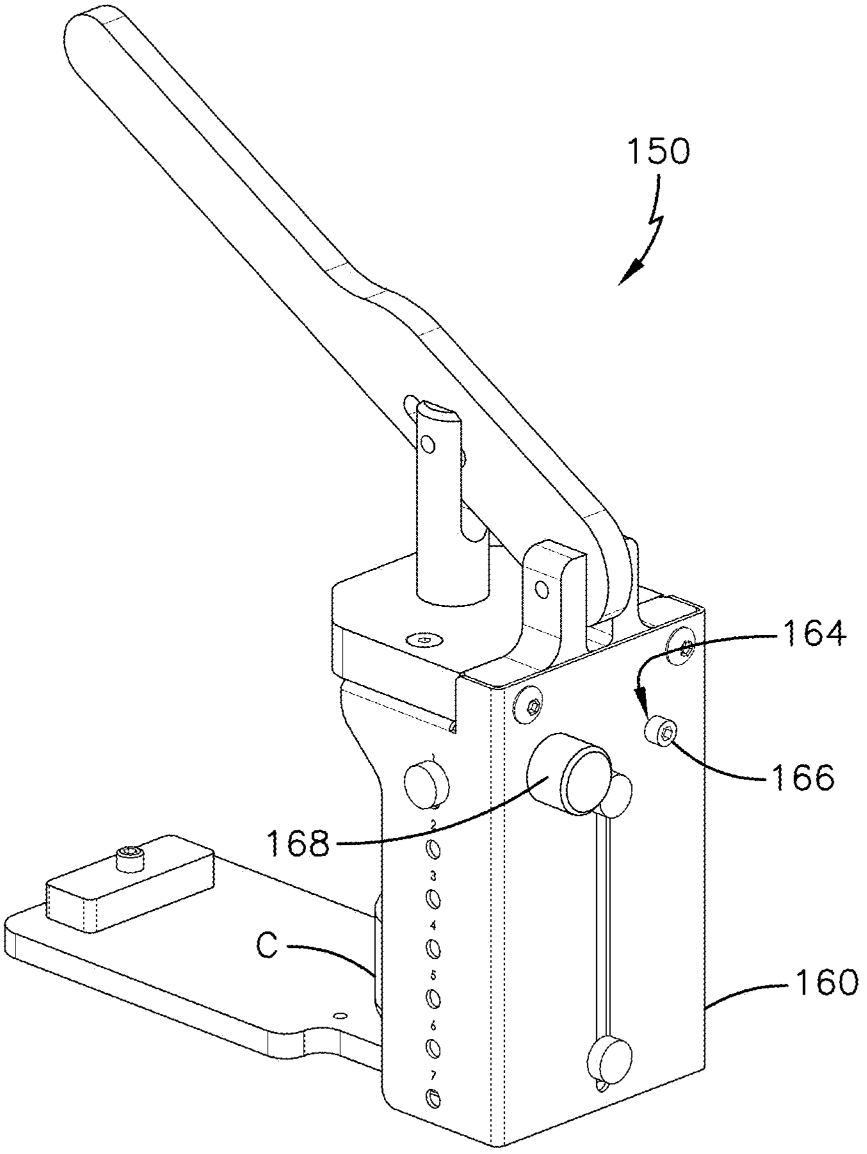
FIG. 21 is a perspective view of the bottle adapter press of FIG. 16, wherein the bottle of FIG. 20 is also shown.
Figure 22:
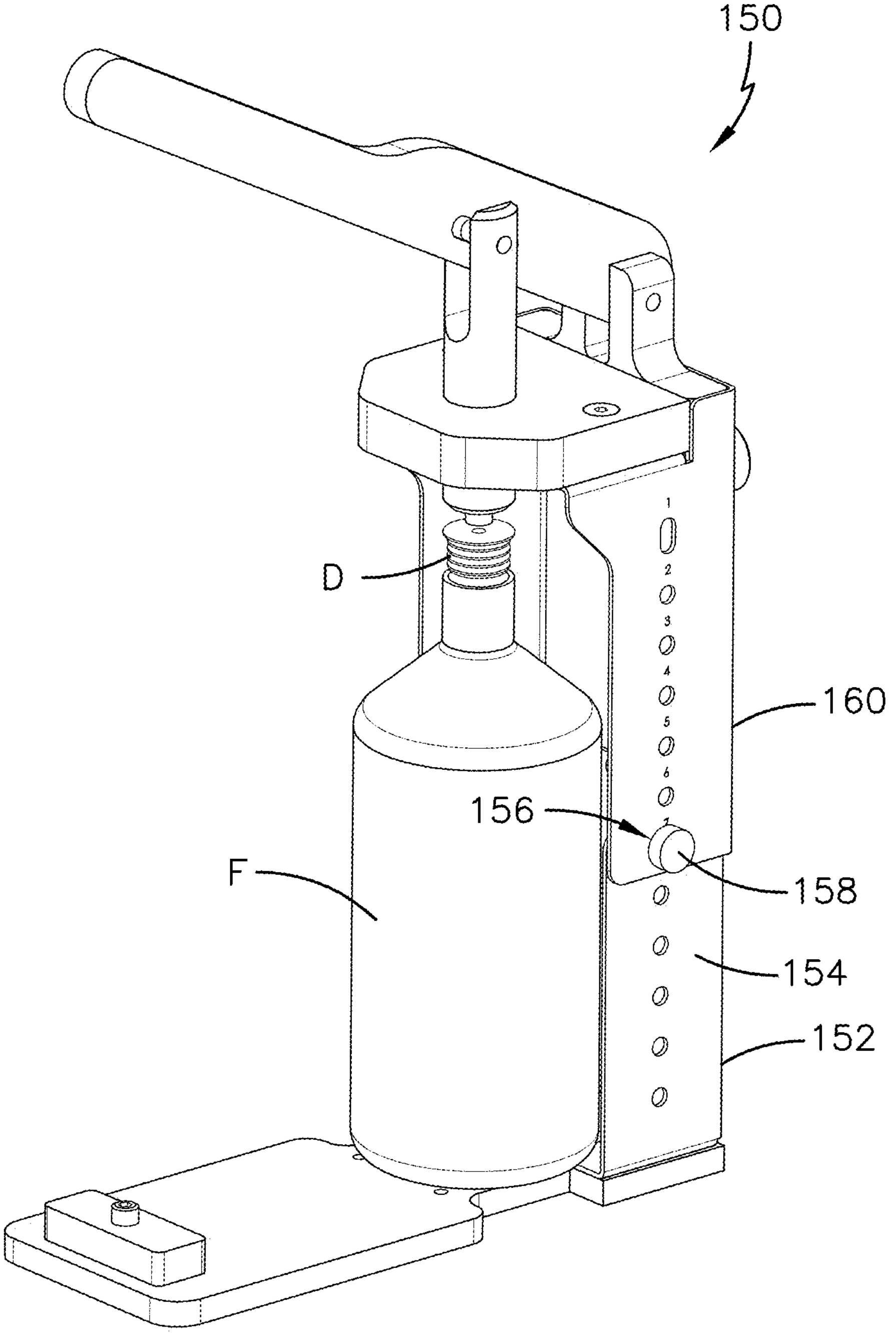
FIG. 22 is a perspective view of the bottle adapter press of FIG. 16, wherein another exemplary bottle and bottle adapter are also shown.
Figure 23:
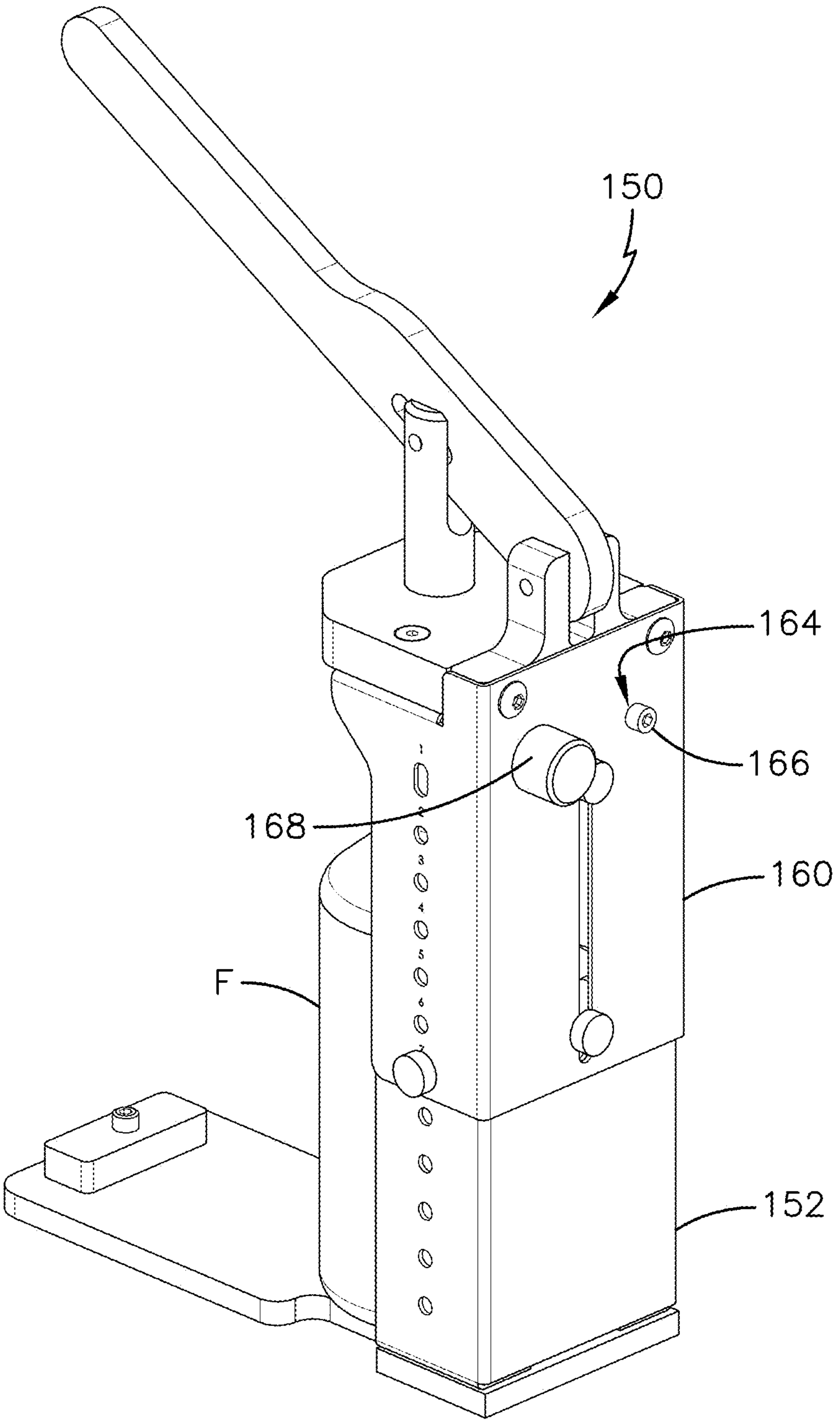
FIG. 23 is a perspective view of the bottle adapter press of FIG. 16, wherein the bottle of FIG. 22 is also shown.

FIGS. 16-23 show an exemplary embodiment of device 150. In this embodiment, as best shown in FIGS. 22 and 23, a first support wall 152 of device 150 has a substantially planar portion 154 that only has one hole 156 (shown receiving a fastener 158) to facilitate height adjustment as previously described with respect to other embodiments. In particular, when adjusting, hole 156 may simplify alignment with the respective holes of second support wall 160 of device 150. Such as shown in FIG. 23, an opposing substantially planar portion of first support wall 152 may also only have one hole similar to hole 156 to facilitate adjustment.

Figure 17:
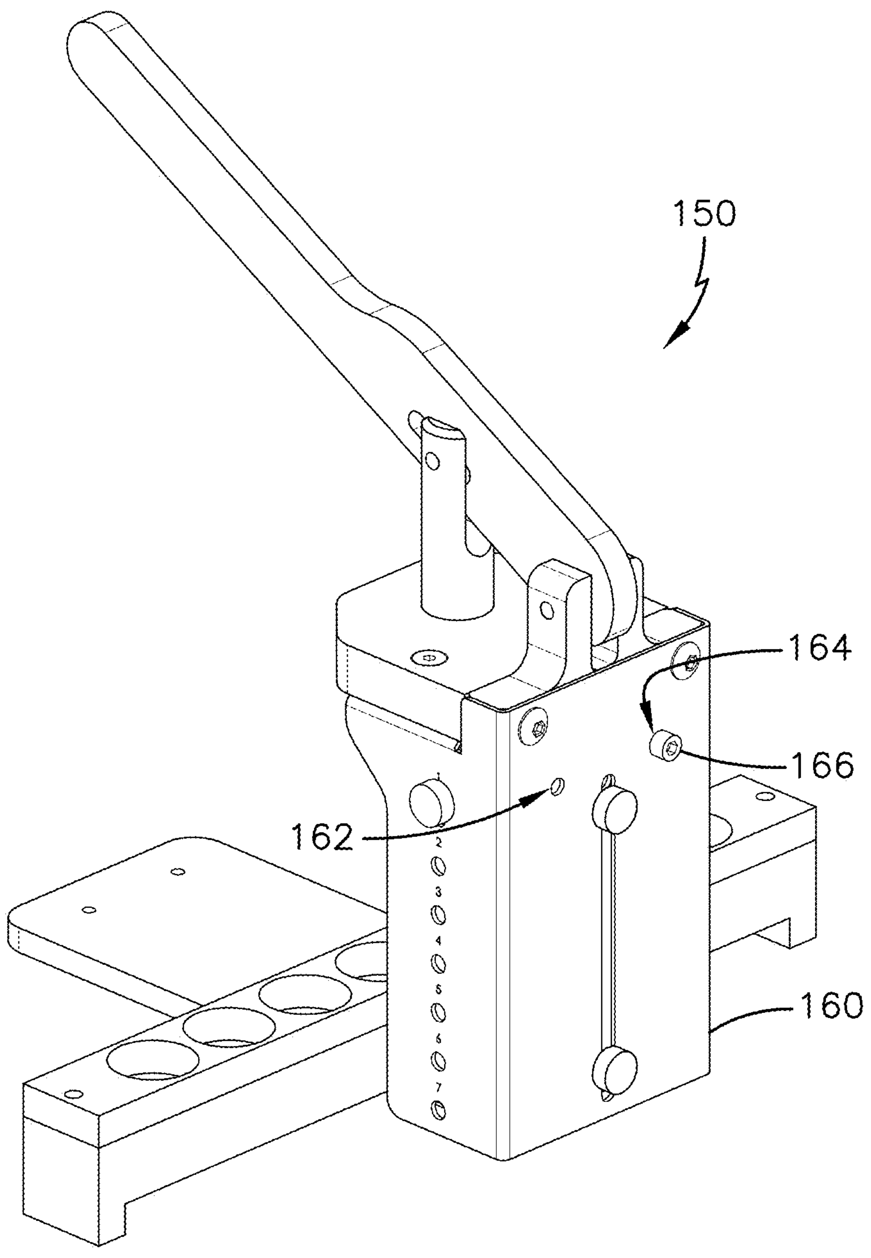
FIG. 17 is a perspective view of the bottle adapter press of FIG. 16, wherein the tray of FIG. 16 is also shown.

As best shown in FIGS. 17, 19, 21, and 23, second support wall 160 also has a substantially planar portion with additional holes 162 and 164 that may assist with setting the distance between the base (or other support surface in other embodiments) and platform; may stabilize first support wall 152 and second support wall 160 such as during a process of installing a fitment on a container; and/or may be a receptacle such as for receiving an attachment of, or for use with, device 150. In FIGS. 17, 21, and 23, hole 164 is shown receiving an attachment (e.g., press adapter) 166. On the other hand, hole 162 is shown receiving an attachment (e.g., press adapter) 168 in FIGS. 19, 21, and 23. First support wall 152 may have holes that are complementary with holes 162 and 164 such as to assist with or facilitate the above functions of holes 162 and 164.

Figure 16:
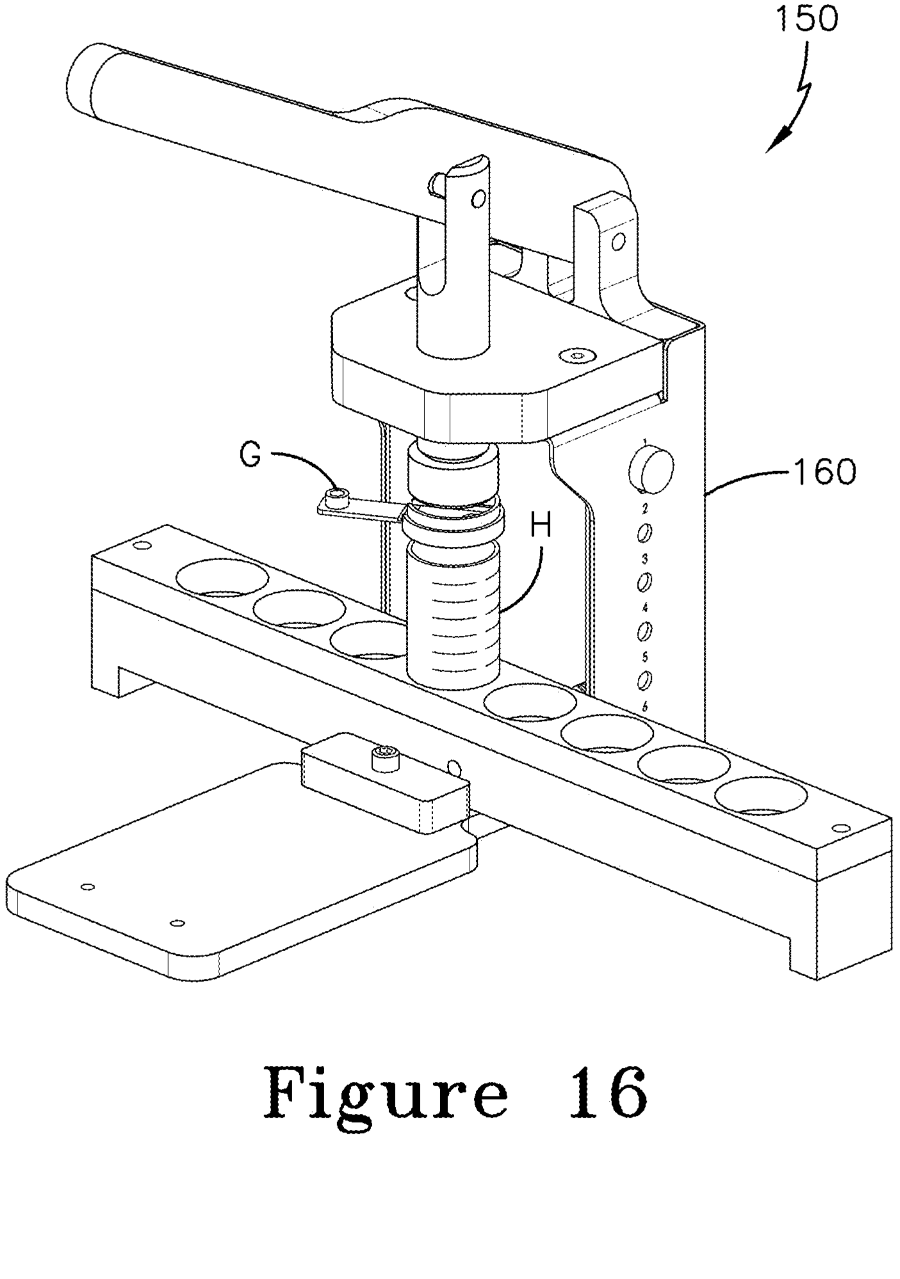
FIG. 16 is a perspective view of another exemplary embodiment of a bottle adapter press, wherein an exemplary vial is also shown positioned on an exemplary tray to receive a cap.
Figure 18:
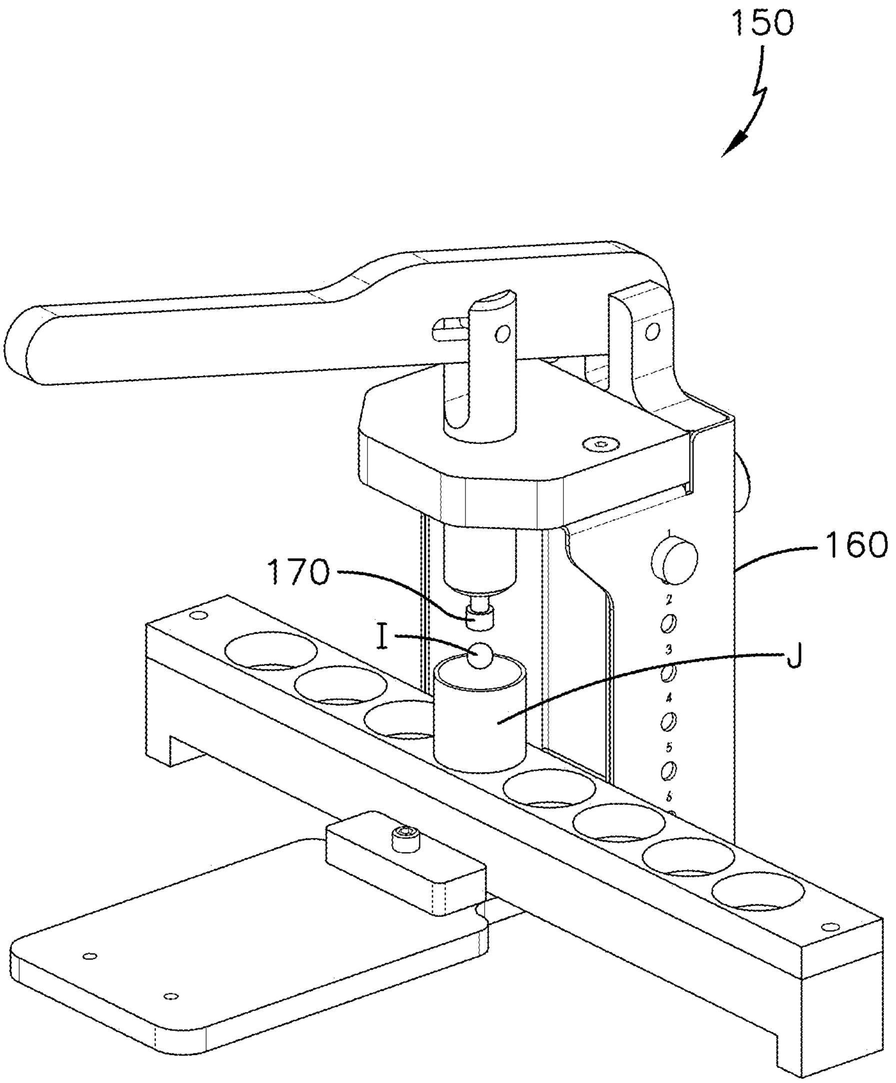
FIG. 18 is a perspective view of the bottle adapter press of FIG. 16, wherein another exemplary vial is shown positioned on an exemplary tray to receive a plug.
Figure 19:
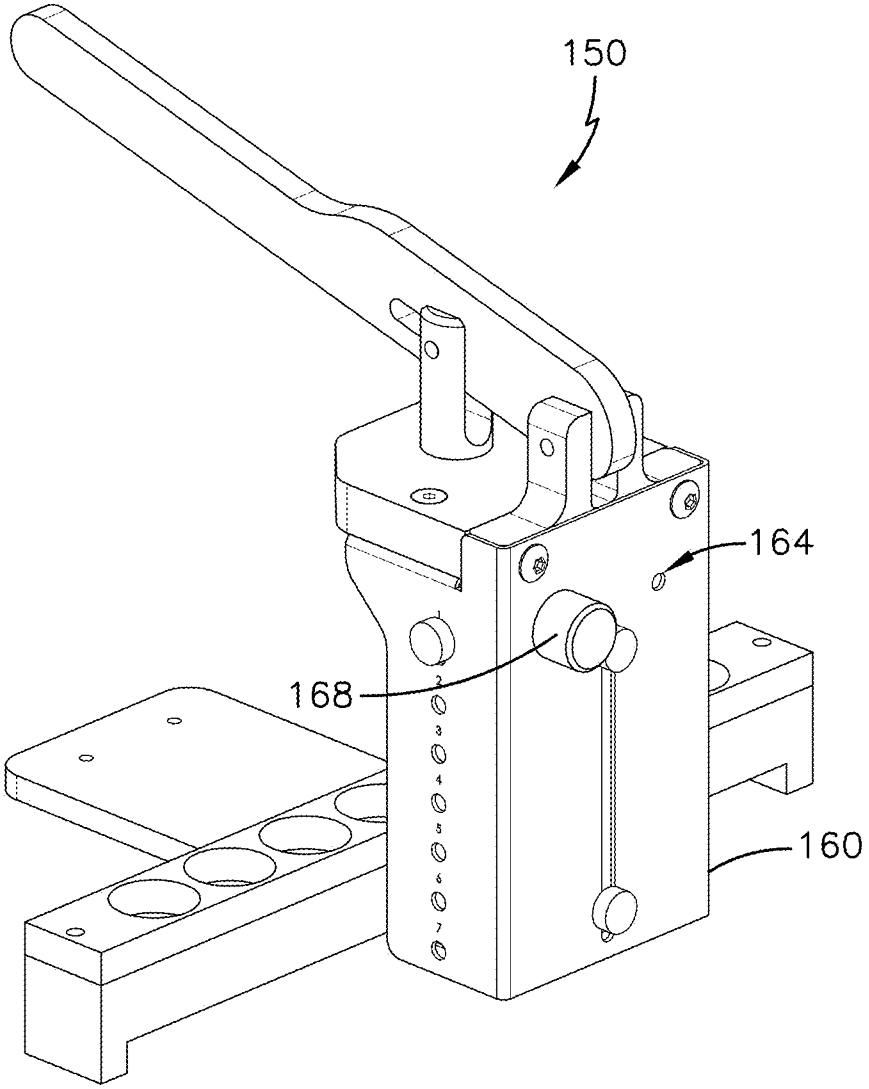
FIG. 19 is a perspective view of the bottle adapter press of FIG. 16, wherein the tray of FIG. 18 is also shown.

FIGS. 16-23 also show various uses of device 150. In FIGS. 16 and 17, device 150 is shown in a configuration in which it is adapted to install a fitment (i.e., cap) G on a Tamper Tuf™ vial H. FIGS. 18 and 19 show device 150 configured such that a press adapter (i.e., the head of the screw or bolt) 170 is adapted to press the fitment (i.e., sealing ball) I into an Easy Fill™ vial J. In FIGS. 20 and 21, similar to the example of FIG. 1, device 150 is shown in a configuration to install a fitment A in a small bottle C, which are commercially available from Health Care Logistics. On the other hand, in FIGS. 22 and 23, similar to the example of FIG. 2, device 150 is shown in a configuration to install a fitment D in a large bottle F, which are also commercially available from Health Care Logistics. Device 150 may also be adapted for use with various other types of containers.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device adapted to install a fitment on a container having an opening, said device comprising:

a base adapted to receive a container having an opening;

at least one support wall associated with said base, said at least one support wall extending substantially vertically relative to said base;

a platform supported by said at least one support wall such that said platform extends over said base, said platform defining an opening;

a lever associated with said platform, said lever adapted to move between a first position and a second position; and a ram associated with said lever and configured to extend through said opening defined by said platform;

wherein said at least one support wall is adjustable such that a distance between said base and said platform is adjustable;

wherein said lever when moved from said first position to said second position is adapted to cause said ram to press a fitment in or over the opening of the container; and wherein the adjustable distance between said base and said platform is adapted to allow for said device to be used for, respectively, installing fitments on different sizes of containers.

2. The device of claim 1 wherein said base is an aluminum plate.

3. The device of claim 1 wherein said at least one support wall is comprised of a first support wall and a second support wall, said first support wall in a slidable relationship with said second support wall.

4. The device of claim 3 wherein said slidable relationship is indexable such that respective distances between said base and said platform are adapted to be set.

5. The device of claim 4 wherein:

said first support wall defines at least one hole; and said second support wall defines a set of multiple holes;

wherein said at least one hole of said first support wall is adapted to be aligned with at least a respective one of said set of multiple holes of said second support wall such that a distance between said base and said platform is adapted to be set.

6. The device of claim 5 wherein:

said at least one hole is in a second set of multiple holes of said first support wall; and said second set of multiple holes of said first support wall is aligned with said set of multiple holes of said second support wall.

7. The device of claim 5 wherein said at least one hole of said first support wall is a tapped hole.

8. The device of claim 5 wherein said at least one hole of said first support wall comprises a weld stud.

9. The device of claim 5 wherein:

said at least one hole is on a first substantially planar portion of said first support wall; and said set of multiple holes is on a second substantially planar portion of said second support wall.

10. The device of claim 5 wherein:

said first support wall defines at least one additional hole; and said second support wall defines a third set of multiple holes;

wherein said at least one additional hole of said first support wall is adapted to be aligned with at least a respective one of said third set of multiple holes of said second support wall such that a distance between said base and said platform is adapted to be set.

11. The device of claim 10 wherein:

said at least one additional hole is in a fourth set of multiple holes of said first support wall; and said fourth set of multiple holes of said first support wall is aligned with said third set of multiple holes of said second support wall.

12. The device of claim 10 wherein said respective one of said third set of multiple holes of said second support wall is a tapped hole.

13. The device of claim 10 wherein said respective one of said third set of multiple holes of said second support wall comprises a weld stud.

14. The device of claim 10 wherein:

said at least one hole is on a first substantially planar portion of said first support wall;

said set of multiple holes is on a second substantially planar portion of said second support wall;

said at least one additional hole is on a third substantially planar portion of said first support wall; and said third set of multiple holes is on a fourth substantially planar portion of said second support wall.

15. The device of claim 14 wherein:

said first substantially planar portion, said second substantially planar portion, said third substantially planar portion, and said fourth substantially planar portion are substantially parallel; and said first substantially planar portion and said second substantially planar portion oppose said third substantially planar portion and said fourth substantially planar portion.

16. The device of claim 10 wherein:

said first support wall defines a fifth set of multiple holes; and said second support wall defines a slot;

wherein said slot of said second support wall is adapted to be aligned with at least a respective one of said fifth set of multiple holes of said first support wall such that a distance between said base and said platform is adapted to be set or to help stabilize a positional relationship between said first support wall and said second support wall when said lever is moved from said first position to said second position to cause said ram to press the fitment in or over the opening of the container.

17. The device of claim 16 wherein said respective one of said fifth set of multiple holes of said first support wall is a tapped hole.

18. The device of claim 16 wherein said respective one of said fifth set of multiple holes of said first support wall comprises a weld stud.

19. The device of claim 16 wherein said slot of said second support wall is aligned with said fifth set of multiple holes of said first support wall.

20. The device of claim 19 wherein:

said ram comprises a press adapter that is adapted to press the fitment in or over the opening of the container when said lever is moved from said first position to said second position, said press adapter adapted to be removed from said ram when not in use; and said press adapter, when removed from said ram, is adapted to extend through said slot of said second support wall to be secured to another one of said fifth set of multiple holes of said first support wall for storage.

21. The device of claim 16 wherein:

said at least one hole is on a first substantially planar portion of said first support wall;

said set of multiple holes is on a second substantially planar portion of said second support wall;

said at least one additional hole is on a third substantially planar portion of said first support wall;

said third set of multiple holes is on a fourth substantially planar portion of said second support wall;

said slot is on a fifth substantially planar portion of said second support wall; and said fifth set of multiple holes is on a sixth substantially planar portion of said first support wall.

22. The device of claim 21 wherein:

said first substantially planar portion, said second substantially planar portion, said third substantially planar portion, and said fourth substantially planar portion are substantially parallel;

said first substantially planar portion and said second substantially planar portion oppose said third substantially planar portion and said fourth substantially planar portion;

said fifth substantially planar portion and said sixth substantially planar portion are substantially parallel;

said fifth substantially planar portion is adjoined to said first substantially planar portion and said third substantially planar portion; and said sixth substantially planar portion is adjoined to said second substantially planar portion and said fourth substantially planar portion;

wherein said first support wall and said second support wall respectively have complementary, generally U-shaped, cross-sectional configurations.

23. The device of claim 22 wherein said first support wall is positioned inside said second support wall.

* * * * *